United States Patent [19]

Bristol

[11] 4,211,082
[45] Jul. 8, 1980

[54] INTERNAL COMBUSTION ENGINE WITH FREE FLOATING AUXILIARY PISTON

[76] Inventor: Robert D. Bristol, P.O. Box 377, Beulah, Mich. 49617

[21] Appl. No.: 950,368

[22] Filed: Oct. 11, 1978

[51] Int. Cl.² .......................... F02B 13/22; F04C 1/00
[52] U.S. Cl. ....................................... 60/605; 123/68; 123/70 R; 123/657
[58] Field of Search ............. 123/68, 70, 65 B, 191 R; 60/605, 607, 598, 597

[56] References Cited

U.S. PATENT DOCUMENTS

| | | | |
|---|---|---|---|
| 546,481 | 9/1895 | Bary | 123/68 |
| 680,616 | 8/1901 | Pugh | 123/65 B |
| 705,201 | 7/1902 | Brown | 123/65 B |
| 714,180 | 11/1902 | Hendricks | 123/65 B |
| 1,478,357 | 12/1923 | Powell | 123/68 |
| 1,751,385 | 3/1930 | Beaudry | 123/68 |
| 2,151,218 | 3/1939 | Lutz | 123/32 |
| 2,551,478 | 5/1951 | Wagers | 123/70 |
| 3,675,630 | 7/1972 | Stratton | 123/70 |
| 3,897,769 | 8/1975 | Joelin | 123/191 R |

FOREIGN PATENT DOCUMENTS 815494 6/1959 United Kingdom ...................... 60/605

*Primary Examiner*—Wendell E. Burns
*Attorney, Agent, or Firm*—Price, Heneveld, Huizenga & Cooper

[57] ABSTRACT

An internal combustion engine is disclosed. The engine includes a power cylinder, a power piston reciprocating therein and being connected to a rotating output crank. A free floating double acting auxiliary piston reciprocates within an auxiliary cylinder. Passages connect the upper end of the auxiliary cylinder to a combustion chamber and a source of air. The exhaust from the combustion chamber is connected to the underside of the auxiliary piston through a valved passage. A return cylinder and a cushioning cylinder are coaxially aligned with the auxiliary cylinder at opposite ends thereof and open therein. Elongated pistons extend from the auxiliary piston and into the return cylinder and cushioning cylinder during reciprocation of the auxiliary piston. A gas transfer passage connects the return cylinder with the exhaust from the combustion chamber.

15 Claims, 1 Drawing Figure

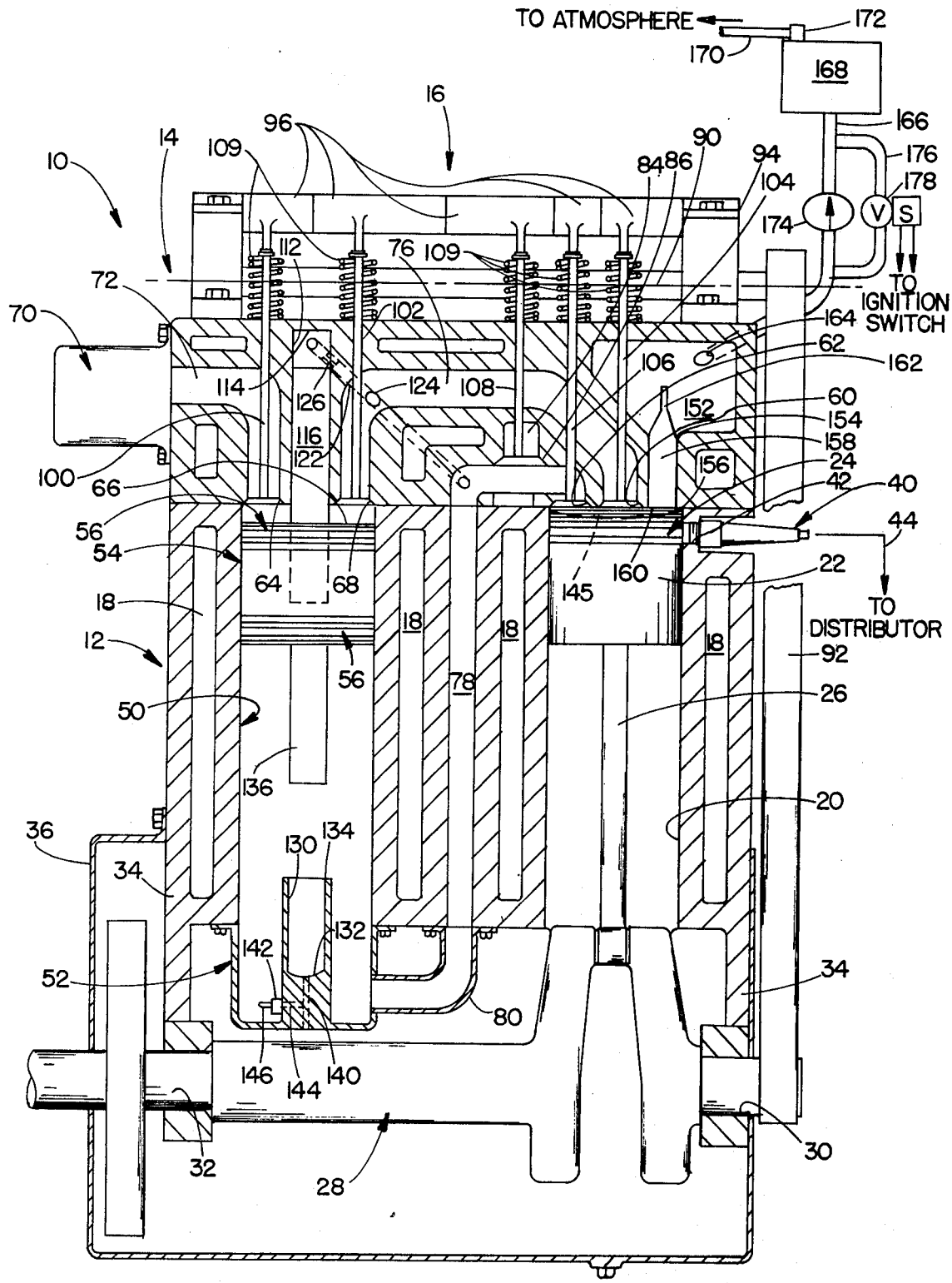

INTERNAL COMBUSTION ENGINE WITH FREE FLOATING AUXILIARY PISTON

BACKGROUND OF THE INVENTION

The present invention relates to internal combustion engines and, more particularly, to a supercharged, two cycle internal combustion engine.

Heretofore various proposals have been made for increasing the thermal and mechanical efficiency of internal combustion engines. In a typical internal combustion engine, as speed increases, the amount of air/fuel mixture taken into the engine on an intake stroke or the volumetric efficiency of the engine will decrease. In normally aspirated engines, only atmospheric pressure acts to force the air/fuel mixture into the engine during the intake stroke. As engine speeds increase, the amount of air/fuel mixture entering the engine rapidly decreases. This reduction in volumetric efficiency reduces the power output and the torque output of the engine at higher engine speeds. Further, in order to insure more complete combustion of the air/fuel mixture within the combustion chamber, the ignition timing is commonly advanced. Ignition occurs prior to the power piston reaching its top dead center position. As a result, the peak pressures within the cylinder acting on the power piston during the power stroke do not occur at the optimum time for maximum torque. As the piston moves past top dead center and towards the bottom dead center position, the pressures within the cylinder fall off rapidly.

In typical two-stroke engines in which a power stroke occurs every two piston strokes or every crankshaft rotation, maximum efficiency and peak powers are not achieved due primary to incomplete exhaust of the burned air/fuel mixture. In a typical piston ported, two cycle engine, an air/fuel mixture enters the crankcase of the engine as the piston moves up to a top dead center position. As the piston moves downwardly during the power stroke, the air/fuel mixture in the crankcase is compressed and transferred through transfer passages to transfer ports. The piston clears the transfer ports and the air/fuel mixture enters the cylinder above the piston. At the same time, the piston has cleared exhaust ports to permit the burnt or spent gases to exit the engine. The incoming air/fuel mixture does not efficiently scavenge the combustion chamber or, under certain conditions, some of the incoming air/fuel mixture may exit the combustion chamber through the exhaust port prior to its being closed by the piston. This mixing of the fresh air/fuel mixture charge with the burned gases and/or the loss of the charge through the exhaust port significantly reduces the power output of the two cycle engine.

Various proposals have heretofore been made to increase the volumetric efficiency, insure more complete scavenging of the exhaust gases or to delay the achievement of peak pressures during the power stroke in order to increase the torque output of the engine. Such prior proposals have included the design of special piston configurations in order to provide staged or delayed pressure increases to compensate for the combustion chamber increase in cubic capacity during the power stroke. An example of one such piston construction may be found in U.S. Pat. No. 3,897,769, issued Aug. 5, 1975, to Jozlin, and entitled SECONDARY COMBUSTION CHAMBERS FOR INTERNAL COMBUSTION ENGINES. Another example of a modified piston construction to achieve similar results may be found in U.S. Pat. No. 2,151,218, issued Mar. 21, 1939, to Lutz, and entitled DIESEL ENGINE. These constructions, while achieving higher average or mean effective pressures, have not solved the problems related to volumetric efficiency and incomplete scavenging of the combustion chamber.

Other proposals to increase the efficiency of two cycle engines have included the use of supercharger devices. The superchargers increase the amount of air/fuel mixture which is delivered to the engine and, therefore, boost the engine power output. Superchargers have been constructed which include a compressor and a turbine linked together by a common shaft. The turbine is rotated by the exhaust gases from the engines. The compressor thereby delivers a compressed charge to the engine cylinders. The supercharger increase the charge delivered to the engine, increasing the volumetric efficiency and increases the power developed during the power stroke.

U.S. Pat. No. 2,551,478, issued May 1, 1951, to Wagers, and entitled SUPER CHARGE TWO CYCLE ENGINE WITH RETARDED FIRING discloses another type of a supercharger used with two cycles. The engine disclosed in this patent includes a main piston, a cylinder and a crankshaft arrangement and an ignition firing means which is adapted to initiate combustion after the piston has moved a considerable distance beyond top dead center. A piston/cylinder and bypass arrangement are included to force air into the main cylinder as the piston is moving beyond top dead center to compensate for compression loss due to piston movement and to supercharge the main cylinder prior to initiation of combustion. The supercharger piston is moved upwardly in a compression and transfer stroke by a cam secured to the engine crankshaft.

U.S. Pat. No. 1,751,385, issued Mar. 18, 1930, to Beaudry, and entitled INTERNAL COMBUSTION ENGINE, discloses a construction wherein a power cylinder receives a compressed air/fuel mixture from an auxiliary piston cylinder arrangement. The auxiliary piston is connected to the engine crankshaft through a connecting rod.

U.S. Pat. No. 3,675,630, issued July 11, 1972, to Stratton, and entitled ENGINE, also discloses a construction wherein a power generating cylinder receives a compressed air/fuel mixture from an auxiliary fluid compressing cylinder. The mixture or charge is ignited after the power piston in the power generating cylinder has passed and is moving away from its top dead center position. Electrically energizable solenoids are included for operating intake, exhaust and transfer valves.

British Pat. No. 815,494, published June 24, 1959, discloses a similar two cycle internal combustion engine which, however, employs the exhaust gases from the power cylinder to operate an air pump. This method of supercharging should increase engine overall efficiency since normally lost energy from the hot exhaust gases is employed as in the rotary or turbine type compressor superchargers. In one embodiment illustrated in this patent, a power piston reciprocates within a piston cylinder. The cylinder defines an intake and an exhaust port. A valve controls passage of the exhaust gases from the exhaust port to an exhaust manifold. When the valve is in a closed position, the exhaust gases act upon a piston of reduced diameter which is connected to a double acting piston of larger diameter. Valves control intake, compression and exhaust of air from the double acting piston cylinder. A smaller piston is also connected to the large piston and is received within a smaller cylinder. The smaller piston compresses air within the smaller cylinder to cushion movement of the double acting piston and also to return the double acting piston to its initial position when the exhaust valve is opened to permit exhaust gases to pass to an exhaust manifold.

SUMMARY OF THE INVENTION

A need exists for an improved internal combustion engine of the two cycle type wherein increased volumetric efficiency is achieved, an increased charge is delivered to a power piston cylinder, the firing of the charge is delayed to achieve increased power output, efficiency is increased through use of the exhaust gases to reciprocate a free floating intake, compression and transfer piston and a more complete exhaust is achieved from the power piston cylinder to prevent mixing of the spent gases with the fresh charge.

The improved internal combustion engine in accordance with the present invention essentially includes a power cylinder, a power piston reciprocating within the power cylinder and connected to an output crank, an intake port opening and an exhaust port opening into a combustion chamber. An auxiliary, secondary or charging cylinder has a free floating auxiliary or charge piston reciprocating therein. Means are provided for defining an intake passage opening into the auxiliary cylinder, a transfer passage connecting the auxiliary cylinder to the combustion chamber, an exhaust transfer passage connecting the combustion chamber to the underside of the free floating piston and a passage connecting the exhaust transfer passage to atmosphere. Valving means are provided for controlling transfer of gases through the various passages. A fluid spring controls upward movement of and biases the auxiliary piston away from the intake and transfer ports. A passage extends from the exhaust transfer passage to the fluid spring means permitting exhaust transfer passage to the fluid spring means permitting exhaust gases to act on the auxiliary piston to bias the piston away from the intake and transfer ports and insure adequate pressure in the fluid spring.

In narrower aspects of the invention, a check valve and a variable restrictor are provided in the passage between the exhaust transfer passage and the fluid spring in order to prevent reverse flow of gases and to control the rate of flow of exhaust gases to the fluid spring. Also, a cushioning piston cylinder or fluid spring is provided to cushion movement of the free floating piston towards its bottom dead center position.

The power piston on its exhaust stroke effectively scavenges the combustion chamber of spent exhaust gases. Minimal or close to zero clearance volume need be provided due to the fact that the charge is compressed by the auxiliary piston cylinder. The free floating piston supercharges the engine, thereby increasing power output and volumetric efficiency.

In order to prevent detonation and to reduce the stresses on the engine, a charge expansion or relief chamber may be provided and which includes a port opening into the combustion chamber. Valve means operatively connected to the power piston extend into the port to delay opening of the port until after the power piston has moved considerably past its top dead center position. The charge expansion chamber permits an overcharge to be transferred to the combustion chamber, thereby increasing the volumetric efficiency. The power output is increased because the pressure is greater and the rate of decrease in pressure is reduced in the cylinder. Detonation is prevented as well as possible damage to the engine components.

BRIEF DESCRIPTION OF THE DRAWING

The single FIGURE is an elevational view in section of a two cycle internal combustion engine in accordance with the present invention.

DETAILED DESCRIPTION OF THE PREFERRED EMBODIMENT

A preferred embodiment of an internal combustion engine of the two cycle type in accordance with the present invention is illustrated in the single drawing and generally designated 10. The engine 10 includes a cylinder block 12, a cylinder head 14 and a valve train or valving means 16.

Cylinder block 12 defines water jacket passages 18 connectable to a conventional cooling system in a manner well known in the art. Cylinder block 12 also defines a power cylinder 20 closed at its top end by the cylinder head 14. A power piston 22 reciprocates within power cylinder 20. Power piston 22 includes conventional ring grooves and compression and oil control rings, generally designated 24. Piston 22 is connected in a conventional fashion through a connecting rod 26 to a rotating output crank 28. Output crank 28 is journaled at its ends 30, 32 in a conventional fashion to cylinder block end walls 34. An oil pan 36 is secured to the cylinder block 12, encloses crank 28 and defines an oil sump in a conventional fashion.

A conventional sparkplug or spark igniter 40 is threadably received within a recess or hole 42 which opens through the sidewall of cylinder 20. For illustrative purposes, the sparkplug 40 has been illustrated in a position rotated 90° from its normal position. Sparkplug 40 is connected to a conventional ignition system which may include a distributor (not shown) through a suitable high tension wire 44.

In the embodiment shown, cylinder block 12 also defines an auxiliary, secondary or charge cylinder 50. The charge cylinder 50 is closed at one end by the cylinder head 14 and at the other end by a cap member 52. Reciprocating within auxiliary cylinder 50 is a free floating, double acting, charge, secondary or auxiliary piston 54. Piston 54 includes ring grooves and suitable compression and oil control rings 56 at each end thereof.

Cylinder head 14 defines, with power cylinder 20 and power piston 22, a combustion chamber between the top of the piston 22 and the undersurface of the cylinder head 14. Cylinder head 14 defines an intake port 60 opening into the combustion chamber and an exhaust port 62 similarly opening into the combustion chamber. The cylinder head defines a charge or air/fuel mixture intake port 64 opening into the top of the auxiliary cylinder 50 above the upper face 66 of piston 54. Head 14 also defines a charge or air/fuel mixture transfer port 68 similarly opening into the top end of cylinder 50. Intake port 64 may be connected to a source of air and fuel, such as a conventional carburetor 70, through a passage 72 defined by the cylinder head. Transfer port 68 is connected to intake port 60 of the power piston cylinder 20 through a charge transfer passage 76 defined by the cylinder head. Exhaust port 62 is connected to the lower side of auxiliary cylinder 50 through a passage 78 defined in part by the cylinder head 14 and by a tubular member 80 which opens into the lower end of the cylinder 50 defined by the cap member 52. An atmospheric exhaust passage 84 is defined by the cylinder head 14. The atmospheric exhaust passage 84 is connected to a suitable exhaust pipe and muffler (not shown) in a conventional fashion. Cylinder head 14 defines an atmospheric exhaust port 86 which communicates the atmospheric exhaust passage with the exhaust transfer passage 78.

Valving means 16 includes a camshaft 90 rotatably supported on the cylinder head 14. Camshaft 90 may be rotated through a timing belt 92 which is driven by crank 28 in a conventional fashion. Supported above camshaft 90 is a rocker arm shaft 94 supporting a plurality of rocker arms 96. Each of the rocker arms engages a respective one of a plurality of valves which control passage of fluid through the above described passages. As illustrated, the valve train 16 includes an intake valve 100 which opens and closes charge intake port 64, a transfer valve 102 which opens and closes transfer port 68, a combustion chamber intake valve 104 which opens and closes power cylinder intake port 60 and an exhaust valve 106 which opens and closes power cylinder exhaust port 62. An atmospheric exhaust valve 108 controls the opening and closing of atmospheric exhaust port 86. Each of the valves is biased to a closed position by suitable valve springs 109 in a conventional fashion. While a mechanical valving mechanism has been illustrated, solenoid operated valves could be employed to control the opening and closing of the various ports. A solenoid operated valving system including a switching mechanism of the type illustrated in U.S. Pat. No. 3,675,630, for example, could be employed. To the extent necessary, the disclosure of this patent is hereby incorporated by reference.

As illustrated, the cylinder head also defines a return or bounce cylinder 112 having a closed end 114. Return cylinder 112 is coaxially aligned with and is of smaller diameter than auxiliary cylinder 50. Coaxially aligned with and extending upwardly from auxiliary piston 54 is a return or bounce piston 116. Return or bounce piston 116 is slidably disposed within return cylinder 112. Cylinder 112 and elongated piston 116, as explained in detail below, define a fluid spring biasing auxiliary piston 54 towards its bottom dead center position and effectively controlling upward movement of the auxiliary piston.

Cylinder head 14 also defines a gas transfer passage 122 which extends between exhaust transfer passage 78 to a point adjacent closed end 114 of return cylinder 112. Passage 122 places return cylinder 112 in communication with exhaust passage 78. Disposed within transfer passage 122 is a check valve 124 and a variable restrictor 126. Check valve 124 may be of conventional construction and could be a reed valve or a ball check valve, for example. Valve 124 prevents reverse flow of exhaust gases from cylinder 112 to exhaust transfer passage 78. Variable restrictor 126 may be of conventional construction and could be of the needle valve type. Valve 126 controls the rate of flow of exhaust gases from passage 78 to cylinder 112 and, hence, controls the spring force or pressure exerted on piston 116. Restrictor 126 is preferably adjustable externally of the engine. The fluid spring defined by cylinder 112 and piston 116 biases piston 54 downwardly in order to force exhaust gases in a reverse direction through passage 78 and out through atmospheric exhaust passage 84.

In order to cushion the downward movement of auxiliary piston 54 and to stop the downward movement to prevent damage to the piston, another fluid spring is provided at the lower end of the cylinder 50. As seen in the drawing, cap member 52 defines an upwardly directed cushioning cylinder 130 having a lower end 132 and an upper, open end 134. Cylinder 130 is coaxially aligned with the auxiliary cylinder 50. Extending downwardly from and coaxially aligned with piston 54 is a cushioning piston 136. Cushioning piston 136 is similar to return piston 116 in that it is an elongated, rod-like member of a diameter substantially less than the diameter of double acting, free floating piston 54. Upon downward movement of piston 54, piston 136 will enter cylinder 130 and compress fluid contained within the cylinder. Compression of the fluid cushions and stops the downward movement of piston 54.

It is presently preferred that provision be made for controlling the spring rate or force exerted on the piston 136 by the gas being compressed within the cylinder 130. A bleed passage 140 extends from end 132 of cylinder 130 into the crankcase defined by oil pan 36. A variable restrictor in the form of a needle valve 142, for example, is threadably disposed in a passage 144 which intersects the bleed passage 140. Rotation of needle valve 142 effectively varies the restriction in passage 140 and, hence, the spring rate or cushioning ability of the gases compressed within cylinder 130 by piston 136. A control member 146 is connected to needle valve 142 and extends externally of the cylinder block in order to permit external control of valve 142.

OPERATION

The various components of the engine as illustrated in the single drawing are positioned at the beginning of the power stroke of power piston 22. Power piston 22 is in its top dead center position and auxiliary piston 54 is approaching its top dead center position. Intake valve 100 is closed, transfer valve 102 is just beginning to open, exhaust valve 106 is closed and power cylinder intake valve 104 is just beginning to open. Atmospheric exhaust valve 108 is closed. Auxiliary piston 54 at this point in the cycle has caused an intake of an air/fuel charge into the auxiliary cylinder and has compressed the air/fuel charge. As power piston 22 moves beyond its top dead center position, valves 102 and 104 open, permitting transfer of the compressed charge into the combustion chamber defined by cylinder 20, cylinder head 14 and piston 22. As piston 22 moves substantially beyond top dead center to a point of optimum mechanical efficiency and with valves 104, 106 closed and valves 100, 108 opening, an ignition timing system causes sparkplug 40 to ignite the supercharged, compressed air mixture.

As the power piston 22 starts to move to bottom dead center, the valve 102 closes and gases compressed within cylinder 112 will act on piston 116 and drive the auxiliary piston 54 toward bottom dead center. Piston 136 enters cylinder 130, cushions and stops the movement of the piston. During the downward movement of piston 54, exhaust gases which had forced the piston upwardly to compress the charge are moved in a reverse direction through passage 78 out port 86 as a result of opening of the atmospheric exhaust valve 108. These exhaust gases are exhausted to atmosphere.

As piston 22 passes through bottom dead center and begins its exhaust stroke, valve 100 closes and exhaust valve 106 opens. Valve 108 also closes. The exhaust gases are propelled through exhaust port 62, exhaust transfer passage 78 and into the lower side of the auxiliary cylinder 50. The exhaust gases act on the undersurface of auxiliary piston 54, forcing the piston upwardly. During the previous downward movement of piston 54, valve 102 closed and valve 100 opened, permitting a charge to enter the cylinder 50 due to the negative pressure produced by downward motion of piston 54. As piston 54 moves upwardly under the pressure exerted thereon by the exhaust gases, it will compress the charge. The cycle is then repeated. When the exhaust gases are flowing through passage 78, they will also flow through passage 122 and into the cylinder 112.

Previous attempts to employ fluid spring devices to control the motion of a free floating auxiliary piston were not felt to be totally satisfactory. Due to manufacturing tolerances, and sealing problems, the gas or fluid within the return fluid spring could bleed off and proper operation could not be obtained. Further, the spring rate and force exerted on the auxiliary piston could not be adequately controlled in order to properly control timing of auxiliary piston 54. Inclusion of passage 122 and variable restrictor 126 obviates these problems. Further, overall mechanical efficiency and thermal efficiency of the engine are increased from that heretofore obtained since additional thermal energy is being employed from the exhaust gases to perform work.

It is presently preferred that power piston 22, connecting rod 26 and crank 28 be dimensioned so that essentially zero clearance is obtained when the power piston 22 is in its top of dead center position. Depressions 145 may be formed in the top of the piston in order to provide for valve clearance. It is preferred, however, that such depressions be kept to a minimum in order to minimize the clearance volume in the combustion chamber. Since the charge is compressed by auxiliary piston 54, the normally provided clearance volume may be reduced. Only a clearance necessary to prevent contact with the valves and to compensate for manufacturing tolerances need be provided.

As a result of this preferred construction, essentially complete exhaust of the combustion gases is obtained from the combustion chamber of the power piston cylinder. This essentially complete removal of the combustion gases alleviates the problems heretofore experienced with respect to the mixing of combustion gases with the fresh air/fuel charge and resulting power loss. This should insure more complete combustion during the power stroke and a significant increase in the power output of the two cycle engine.

AUXILIARY CHAMBER

Another aspect of the invention which permits dimensioning of the auxiliary piston cylinder arrangement in order to compress and transfer a significant overcharge to the power piston is the inclusion of a relief or auxiliary chamber 152. Auxiliary chamber 152, in the embodiment illustrated, is defined by cylinder head 14 and includes an elongated passage 154 having a port 156 opening into the top of cylinder 20. Extending upwardly from the crown of piston 22, is a control valve means 158. Control valve means, in the embodiment illustrated, is a generally bottle-shaped member having a base 160 formed integral with or secured to the top of piston 22 and terminating in a tapering or reduced diameter neck 162. As the overcharge is transferred into the combustion chamber, piston 22 moves considerably past its top dead center postion and ignition occurs, valve means 158 will gradually open port 156 to permit relief of the excess pressure into the relief or auxiliary chamber 152. The provision of such a chamber permits the pressure curve generated within the combustion chamber to be smoothed out and spread out over a greater degree of crank rotation. This relief of pressure eliminates and/or prevents detonation due to overcompression of the charge. Such reduces the occurrence or possibility of severe damage to the engine components due to detonation. The chamber, it is believed, also permits the use of low octane rating fuel to operate the engine. Although chamber 152 is illustrated as integral with head 14, such could be a separate member suitably carried by the head or cylinder block and connected to the combustion chamber.

Auxiliary chamber 152 includes an outlet port 164. Outlet port 164 is connected through suitable tubing 166 to a reserve tank 168. The reserve tank includes an atmospheric exhaust outlet tube 170. A relief valve or pressure regulator 172 may be included in the tube 170 to limit the maximum pressure in reserve chamber 168. It is also preferred that a check valve 174 be positioned within tube 166 so that exhaust gases under pressure will be retained within the reserve tank 168.

The reserve tank therefore becomes a source of pressurized fluid which may be transmitted back to the power piston/cylinder through a bypass tube 176 and a solenoid controlled valve 178 to effect starting of the engine in conjunction with an electric starter which rotates crank 28. Solenoid valve 178 may be connected to a conventional two positon ignition switch which will open the valve when in a "start" position to permit passage of the pressurized fluid from the reserve tank 168 to chamber 152. The charge of fluid entering chamber 152 and subsequently entering the combustion chamber defined by the cylinder head, piston 22 and cylinder 20 insures that a charge is present in the engine to be transferred through the exhaust passage 78 to the underside of the auxiliary piston 54 to effectuate compression and transfer of a fresh charge through passage 76 and intake port 60. In a multi-cylinder construction, it is envisioned that a plurality of chamber 152 may be interconnected or manifolded and the exhaust gases collected thereby employed to propel another power piston connected to crank 28.

As should now be readily apparent to those of ordinary skill in the art, the unique two cycle internal combustion engine in accordance with the present invention prevents or substantially eliminates mixing of the exhaust or combustion gases with the fresh charge through the positive valving and the zero clearance or minimal effective clearance volume of the power piston and cylinder head. The mechanical efficiency of the engine is increased due to the supercharging and a delayed or retarded ignition of the charge without significant or power robbing reduction in the pressures within the chamber due to expansion of the combustion chamber volume. Also, the thermal and mechanical efficiency of the engine are increased from prior supercharged auxiliary piston type engines. The exhaust gases are employed to intake, compress and transfer a fresh charge to the power piston cylinder. Since the auxiliary piston 54 is not connected to output crank 28, mechanical efficiency is also increased due to reduction in frictional compression and inertia losses. The engine in accordance with the present invention permits auxiliary piston 54 or auxiliary pistons, depending upon the number of power pistons incorporated in the engine design, to be fabricated with reduced weight from that heretofore employed. Pistons 54, since they are free floating and subjected to far lower pressures than the power piston, do not require the same strength as would be necessary if they were connected to the output crank of the engine. Further, a free floating auxiliary pistion permits a reduction in the weight and the size of output crankshaft 28 than has been obtained from prior two stroke engines employing a cranked supercharging piston cylinder arrangement. The variable restrictions in gas transfer passage 122 and the variable bleed passage arrangement in the cushioning cylinder permit effective control of the timing of auxiliary piston 54. Such effective control has not been heretofore obtainable from the prior proposed constructions. Further, relief chamber 152, when incorporated into the engine, permits the auxiliary piston cylinder arrangement to be designed to transfer a substantial overcharge to the power piston without risk of detonation and/or damage to the engine. Flattening of the power curve of the engine during the power stroke of piston 22, increasing of the average pressure within the cylinder and, hence, the power output should result.

Conventional lubricating systems may be employed with the internal combustion engine in accordance with the present invention. For example, a pump-type oil injection system including outlet nozzles positioned in the walls of cylinder 50 may be employed to lubricate the cylinder walls and reduce the friction between free floating piston 54 and cylinder 50. A pressure-type oil lubrication system may also be employed to lubricate the cylinder walls of cylinder 20 and to lubricate the overhead valve train 16. Since these subsystems are well known in the art, they have not been illustrated and described in any detail.

Further, the drawing has been simplified to illustrate the inventive concepts in an easily understandable manner. The relationship of the auxiliary piston to the power piston, the number of such pistons and the location and length of the various passages may, of course, vary from that illustrated in actual applications.

In view of the foregoing description, those of ordinary skill in the art will undoubtedly envision various modifications to the embodiment illustrated which would not depart from the inventive concepts disclosed herein. For example, as discussed above, mechanical valve train 16 may be replaced by an electric solenoid operated valving system. Electric solenoid operation of the valves may, in fact, be preferred since such may result in faster response times and better valve control. Such systems would also more readily permit variance or experimentation with the valve timing in order to obtain maximum efficiency and power output. Various types of check valves and variable restrictors may be employed for the elements which have been schematically illustrated. Although the inventive concepts have been disclosed in the context of a single power piston cylinder and a single auxiliary piston cylinder engine, a plurality of such auxiliary and power piston cylinder systems may be interconnected on a single crank, either in an in-line or V configuration.

Therefore, it is expressly intended that the above description should be considered as that of the preferred embodiment only. The true spirit and scope of the present invention may be determined by reference to the appended claims.

The embodiments of the invention in which an exclusive property or privilege is claimed are defined as follows.

1. An internal combustion engine comprising:
   a cylinder block defining a power cylinder;
   a power piston reciprocating within said power cylinder and means defining a combustion chamber with said power cylinder and power piston;
   an output crank connected to said power piston by a connecting rod;
   an auxiliary cylinder having a first and a second end;
   a free floating double acting auxiliary piston disposed within said auxiliary cylinder for reciprocation therein;
   means defining an intake passage connecting said first end of said auxiliary cylinder to a source of air;
   means defining a transfer passage for connecting said first end to said combustion chamber;
   means defining an exhaust transfer passage for connecting said combustion chamber with said second end of said auxiliary cylinder;
   means defining an atmospheric exhaust passage for connecting said exhaust transfer passage to atmosphere;
   a return cylinder coaxially aligned with said auxiliary cylinder and opening into said auxiliary cylinder;
   a return piston coaxially aligned with and connected to said auxiliary piston, said return pistion extending from said auxiliary piston into said return cylinder;
   a cushioning cylinder opening into said auxiliary cylinder at the second end thereof and being coaxially aligned with said auxiliary cylinder;
   a cushioning piston connected to and coaxially aligned with said auxiliary piston, said cushioning piston extending toward said second end and entering said cushioning cylinder during reciprocation of said auxiliary piston;
   a gas transfer passage connecting said return cylinder with said exhaust transfer passage;
   check valve means within said gas transfer passage for permitting flow only from said exhaust transfer passage to said return cylinder through said gas transfer passage; and
   valving means disposed within said intake passage, said exhaust transfer passage and said atmospheric exhaust passage for controlling the flow of gases through said passages so that said auxiliary piston intakes, compresses and transfers a gas to said combustion chamber and exhaust from said combustion chamber passes to said auxiliary cylinder to move said auxiliary piston from said second end to said first end and for opening said exhaust transfer passage to said atmospheric exhaust passage when said auxiliary piston moves from said first end to said second end.

2. An improved internal combustion engine as defined by claim 1 further including a variable restrictor upstream of said check valve means within said gas transfer passage for controlling the force acting on said return piston urging said return piston toward said second end.

3. An improved internal combustion engine as defined by claim 1 further including relief chamber means defining a relief chamber having a port opening into said combustion chamber and relief valve means operatively connected to said power piston for opening said port to said combustion chamber after said power piston has moved past top dead center to reduce the pressure within said combustion chamber.

4. An improved internal combustion engine as defined by claim 3 further including means defining a bleed passage for controlling the pressure actiing on said cushioning piston during the intake/exhaust stroke of said auxiliary piston.

5. An improved internal combustion engine as defined by claim 4 wherein said relief valve means comprises a bottle-shaped member having a base tapering to a top, said member controlling the opening of said port as said power piston moves away from top dead center.

6. An improved internal combustion engine as defined by claim 4 further including a vairable restrictor within said bleed passage for controlling the rate of bleed off through said bleed passage.

7. An improved internal combustion engine as defined by claim 6 furhter including a spark igniter carried by said power cylinder for igniting a combustible mixture within said combustion chamber after said power piston has passed top dead center.

8. An internal combustion engine of the type including a cylinder block defining at least one power cylinder, a power piston reciprocating within said power cylinder and connected to a rotatable output crank, a cylinder head secured to said cylinder block and defining with said power cylinder a combustion chamber, said head further defining an intake port opening into said combustion chamber and an exhaust port opening into said combustion chamber, an intake valve supported on said head for opening and closing said intake port, an exhaust valve on said head for opening and closing said exhaust port in a predetermined timed relationship with the postion of said power piston, said cylinder block further defining a charging cylinder, said charging cylinder being closed at one end by said cylinder head and closed at its opposite end, a charging piston disposed in said charging cylinder for reciprocating movement towards and away from said cylinder head, wherein the improvement comprises:

means defining a fluid return spring for biasing said charging piston towards said opposite end of said charging cylinder;

one of said cylinder head and said cylinder block defining a charge intake port opening into said charging cylinder, a transfer port opening into said charging cylinder and a charge transfer passage connecting said transfer port to said intake port, an exhaust transfer passage connecting said exhaust port to said charging cylinder at said opposite end and an atmospheric exhaust port opening into said exhaust transfer passage and communicating said exhaust transfer passage with atmosphere;

a charge intake valve supported on said head for opening and closing said charge intake port in timed relationship to movement of said charge piston, a charge transfer valve supported on said head for opening and closing said transfer port in timed relationship with movement of said charge piston and an atmospheric exhaust valve supported on said head for opening and closing said atmospheric exhaust port in timed relationship with movement of said charge piston whereby, when said power piston is on its exhaust stroke, exhaust gases pass through said exhaust transfer passage and act on said charge piston to compress a charge, the compressed charge is transferred to said combustion chamber after said power piston passes its top dead center position and said charge piston is moved towards its opposite end to force the exhaust back through said exhaust transfer passage and out said atmospheric exhaust port while intaking a new charge into said charge cylinder; and passage means extending between said exhaust transfer passage and said fluid spring means for permitting exhaust gas to act on said charge piston to bias said charge piston to the opposite end of said charge cylinder.

9. An internal combustion engine as defined by claim 8 wherein said fluid spring means comprises:

an elongated cylinder coaxially aligned with said charge cylinder, said elongated cylinder being closed at one end and opening at its opposite end into said charge cylinder;

an elongated spring piston carried by said charge piston and extending into said elongated cylinder, said passage means opening into said elongated cylinder at its closed end.

10. An internal combustion engine as defined by claim 9 further including:

a check valve within said passage means for preventing flow from said elongated cylinder to said exhaust transfer passage; and a variable restrictor within said passage means for controlling the rate of flow of exhaust through said passage means.

11. An internal combustion engine as defined by claim 10 further including another fluid spring means at the opposite end of said charge cylinder for controlling movement of said charge piston towards the opposite end of said charging cylinder.

12. An internal combustion engine as defined by claim 11 wherein said another fluid spring means includes a variable restriction bleed off means for controlling the spring rate thereof.

13. An internal combustion engine as defined by claim 10 further including a charge expansion chamber having a port opening into said combustion chamber and means for placing said charge expansion chamber into communication with said combustion chamber after said power piston has passed its top dead center position, whereby an overcharge may be transferred to said comubustion chamber by said charge piston and the pressure within said combustion chamber may be relieved to prevent detonation and damage to said engine.

14. An internal combustion engine as defined by claim 13 further including:

a reserve tank;

means placing said reserve tank into communication with said charge expansion chamber;

a check valve to prevent reverse flow from said reserve tank to said charge expansion chamber; and means for permitting gases in said reserve tank to pass from said tank to said charge expansion chamber for initial start up of the engine.

15. An internal combustion engine as defined by claim 14 wherein one of said cylinder head and said power piston is flat at said combustion chamber and the other of said head and power piston includes depressions to provide clearance for said intake valve and said exhaust valve, said combustion chamber having a minimal volume when said power piston is at top dead center.

* * * * *

UNITED STATES PATENT AND TRADEMARK OFFICE
CERTIFICATE OF CORRECTION

PATENT NO. : 4,211,082
DATED : July 8, 1980
INVENTOR(S) : Robert D. Bristol

It is certified that error appears in the above-identified patent and that said Letters Patent are hereby corrected as shown below:

Column 1, line 35:

"primary" should be --primarily--;

Column 2, line 15:

"engines" should be --engine--;

Column 2, line 17:

"increase" should be --increases--;

Column 3, line 8:

"gases" should be --gas--;

Column 3, lines 41 & 42:

Delete "transfer passage to the fluid spring means permitting exhaust";

UNITED STATES PATENT AND TRADEMARK OFFICE
CERTIFICATE OF CORRECTION

PATENT NO. : 4,211,082
DATED : July 8, 1980
INVENTOR(S) : Robert D. Bristol

It is certified that error appears in the above-identified patent and that said Letters Patent are hereby corrected as shown below:

Column 8, line 45:

"chamber" should be --chambers--;

Column 11, line 7:

"actiing" should be --acting--;

Column 11, line 20:

"furhter" should be --further--.

Signed and Sealed this

Twenty-fifth Day of November 1980

[SEAL]

Attest:

SIDNEY A. DIAMOND

Attesting Officer   Commissioner of Patents and Trademarks